United States Patent [19]

Frenkel et al.

[11] 3,963,534

[45] June 15, 1976

[54] ZIRCONIUM ALLOYS

[75] Inventors: Jean-Mathieu Frenkel, Paris; Jacques Pelchat, Vitry; Michel Weisz, Orsay, all of France

[73] Assignee: Commissariat a l'Energie Atomique, Paris, France

[22] Filed: Feb. 28, 1974

[21] Appl. No.: 446,799

[30] Foreign Application Priority Data

Mar. 2, 1973 France ............................... 73.7617

[52] U.S. Cl. .......................... 148/133; 148/11.5 F; 176/88; 176/91 R

[51] Int. Cl.[2] ............................................ C21D 1/26

[58] Field of Search ........ 148/32, 32.5, 133, 11.5 F; 75/177; 176/88, 91

[56] References Cited

UNITED STATES PATENTS

| | | | |
|---|---|---|---|
| 3,148,055 | 9/1964 | Kass et al. | 75/177 |
| 3,271,205 | 9/1966 | Winton et al. | 75/177 X |
| 3,567,522 | 3/1971 | Thomas et al. | 148/11.5 F |

FOREIGN PATENTS OR APPLICATIONS

| | | | |
|---|---|---|---|
| 923,212 | 4/1963 | United Kingdom | 148/11.5 F |

OTHER PUBLICATIONS

Zirconium, Miller, 2nd Ed. 1957 Academic Press N.Y.
AECD-3680, "Tensile Properties of Zr Alloys," Simcoe et al., Nov. 20, 1951, p. 29.

*Primary Examiner*—C. Lovell
*Attorney, Agent, or Firm*—Lane, Aitken, Dunner & Ziems

[57] ABSTRACT

In a method of fabrication of nuclear reactor components such as fuel cans and pressure tubes, use is made of zirconium alloys such as Zircaloy 2 or Zircaloy 4 having an oxygen content of 0.14 to 0.25 % by weight. The components are subjected to an annealing operation at a temperature within the range of 400° to 750°C and especially 525° to 750°C over a period of approximately two hours, thus resulting in recrystallization.

4 Claims, No Drawings

ZIRCONIUM ALLOYS

This invention relates to a method of fabrication of nuclear reactor elements such as cans and pressure tubes made from zirconium alloys which offer particularly high creep resistance.

In water-cooled reactors, the cans which surround the fuel must withstand temperatures within the range of 300° to 500°C and the action of the heat-transporting fluid or water in this instance, which gives rise to a permanent reduction in diameter of the cans under the action of both pressure and temperature.

This phenomenon, which has the well-known designation of creep, tends to take up the space which must exist between the can and the fuel and thus to cause an interaction between the fuel pellets and the can itself, which in turn has an adverse effect on the resistance of the can. Creep deformation in portions of the can which do not contain fuel is liable to cause more or less substantial flattening of the can and this may proceed to the point of total buckling.

Many studies have been made with a view to improving zirconium alloys in regard to their properties of mechanical strength and corrosion resistance but no satisfactory method of increasing their creep resistance has yet been found. There has now been discovered a means for improving said creep resistance, quite unexpectedly, by modifying the proportion of oxygen contained in the alloys.

The method in accordance with the invention is applicable to zirconium-base alloys of the type usually employed in the fabrication of nuclear reactor elements such as cans and pressure tubes, the quantity of oxygen contained in these alloys being within range of 0.14 to 0.25 % by weight.

A number of zirconium alloys are suitable for the fabrication of nuclear reactor elements such as cans and pressure tubes and can be employed in accordance with the invention. Among these can be mentioned the commercially available alloys known as "Zircaloys", namely Zircaloy 2 which contains 1 to 2 % tin, 0.07 to 0.24 % iron, 0.05 to 0.015 % chromium, 0.07 to 0.08 % nickel and the complement of zirconium, and Zircaloy 4 which contains a smaller quantity of nickel.

Also worthy of note are the zirconium alloys which contain iron and chromium, those which contain iron, chromium and tin and those which contain niobium.

It has long been considered that oxygen inserted in the zirconium alloys did not modify the high-temperature mechanical characteristics and in particular the creep characteristics since oxygen was considered as an impurity of no interest. This question has been studied in particular by B. Lustmann and F. Kerze in their book published in 1955 and entitled "The Metallurgy of Zirconium".

Systematic tests carried out within the scope of the present invention and applied to fuel cans for water-cooled reactors have shown that the addition of oxygen makes it possible to increase the creep resistance and the elastic limit over a range of temperatures between 250° and 500°C.

It has been found that the creep resistance obtained could be improved even further by addition of oxygen by subjecting the can to a recrystallization annealing operation.

The invention is directed to a method of fabrication of nuclear reactor elements such as cans and pressure tubes of zirconium alloys, wherein use is made of zirconium alloys having an oxygen content of 0.14 to 0.25 % by weight and wherein said alloys are subjected to an annealing operation at a temperature within the range of 400° to 750°C and especially 525° to 750°C over a period of approximately two hours, thus resulting in recrystallization. The period should be at least ½ hour.

It has been possible to establish the fact that the action of oxygen was intrinsic and was not dependent either on its mode of insertion within the alloy or on variations in chemical compositions as are usually encountered during a manufacturing process involving a large number of cans or other structural elements.

Creep resistance tests have been performed under conditions similar to those prevailing within a reactor on different cans of Zircaloy 4 which have been subjected to the same metallurigical treatment and in particular to the same annealing operation at 600°C for a period of two hours. Said cans were subjected to the action of a pressure which applied a circumferential stress of 13 kg/mm$^2$ at 400°C.

At the end of a period of 250 hours, the diametral deformation was 0.6 % on an average in the case of cans in which the alloy contained between 0.1 and 0.13 % by weight of oxygen whereas said deformation was lower than or equal to 0.15 % in the case of cans having oxygen concentrations within the range of 0.14 to 0.25 % by weight.

It is apparent from a comparison of these results that the alloys in accordance with the invention exhibit a diametral deformation under test conditions which can be four times less extensive than in conventional alloys. This has the effect of delaying the harmful interaction between the fuel and the can to a considerable extent and of increasing the buckling strength of the can.

The results of tests which are recorded in the table below show that the cans formed of alloys in accordance with the invention also have an elastic limit which is higher than that of cans formed of alloys having a low oxygen content, whether in the case of monoaxial stresses applied alone in the longitudinal direction or in the case of longitudinal and circumferential biaxial stresses applied simultaneously. It is pointed out that in the example given, the value of applied circumferential stress was twice the value of the applied longitudinal stress.

TABLE

| Cans of Zircaloy 4 Oxygen concentrations in % by weight | Elastic limit at 0.2 % in kg/mm$^2$ at 400°C after annealing for 2 hrs. at 600°C | |
|---|---|---|
| | Applied longitudinal stress | Applied longitudinal and circumferential stresses $\frac{\text{Circ. stress}}{\text{Long. stress}} = 2$ |
| 0.1 to 0.16 | 12 | 18.5 |
| 0.14 to 0.25 | 16 | 24.5 |

The above-noted increase in the elastic limit is of interest in all cases of fast stresses to which the fuel can is subjected and results in particular in improved buckling resistance of said can.

Said increase permits partial compensation for the reduction of elastic limit which results from high-temperature heat treatments after work-hardening.

The heat treatment in accordance with the invention therefore makes it possible to improve not only the stress corrosion resistance of fuel cans in known manner but also permits partial prevention of any substantial reduction of elastic limit which would result from a similar treatment applied to alloys other than those which are contemplated in the present invention.

In other words, the presence of oxygen within zirconium alloys has the effect of increasing the creep resistance and permits a smaller reduction of the elastic limit than is the case with conventional alloys which have a low oxygen content.

What we claim is:

1. In a method of manufacturing fuel cans and pressure tubes from Zircaloy-2 or Zircaloy-4 for use in nuclear reactors the improvement wherein said fuel cans or pressure tubes are annealed at a temperature from 400°C to 750°C for a sufficient period of time to cause recrystallization, said period being at least ½ hour.

2. In the method of claim 1 the further improvement wherein said fuel cans or pressure tubes are annealed at a temperature of from 525°C to 750°C.

3. In the method of claim 2 the further improvement wherein said fuel cans or pressure tubes are annealed for a period of about two hours.

4. In the method of claim 1 the further improvement wherein said zirconium alloy contains about 1 to about 2% tin, about 0.07 to about 0.24% iron, about 0.05 to about 0.015% chromium and about 0.07 to about 0.08% Ni, the remainder being chromium.

* * * * *